(12) United States Patent  
Chaintreau et al.

(10) Patent No.: US 9,307,023 B2  
(45) Date of Patent: Apr. 5, 2016

(54) DEVICE AND METHOD FOR CONTROLLING DISSEMINATION OF CONTENTS BETWEEN PEERS HAVING WIRELESS COMMUNICATION CAPACITIES, DEPENDING ON IMPATIENCE REACTION FUNCTIONS

(71) Applicant: THOMSON LICENSING, Issy-les-Moulineaux (FR)

(72) Inventors: Augustin Chaintreau, Paris (FR); Joshua Reich, West Hempstead, NY (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/506,907

(22) Filed: Oct. 6, 2014

(65) Prior Publication Data  
US 2015/0026235 A1 Jan. 22, 2015

Related U.S. Application Data

(63) Continuation of application No. 12/799,876, filed on May 4, 2010, now Pat. No. 8,856,327.

(30) Foreign Application Priority Data

May 4, 2009 (EP) ..................................... 09305395

(51) Int. Cl.  
*G06F 15/173* (2006.01)  
*H04L 29/08* (2006.01)  
*H04W 8/20* (2009.01)

(52) U.S. Cl.  
CPC .......... *H04L 67/1076* (2013.01); *H04L 67/104* (2013.01); *H04W 8/20* (2013.01)

(58) Field of Classification Search  
CPC . H04L 67/1074; H04L 67/1076; H04L 45/02; H04L 47/56  
See application file for complete search history.

(56) References Cited

U.S. PATENT DOCUMENTS 7,546,342 B2 6/2009 Li et al.  
7,574,515 B2 8/2009 Fontijn et al.  
(Continued)

FOREIGN PATENT DOCUMENTS

CN 1902975 11/2005  
CN 1778089 5/2006  
(Continued)

OTHER PUBLICATIONS

Cho, Tae Won, "Enabling Content Dissemination Using Efficient and Scalable Multicast", Pub. Date: Apr. 2009, pp. 1-9.*  
(Continued)

*Primary Examiner* — Krista Zele  
*Assistant Examiner* — James Forman  
(74) *Attorney, Agent, or Firm* — Tutunjian & Bitetto, P.C.

(57) ABSTRACT

A method is intended for controlling dissemination of content in a peer-to-peer mode between peers having wireless communication capacities. This method consists, each time a peer receives a content item it had requested and which is associated to a request counter, in creating at least one set of instructions intended for allowing replication of this content item by this peer, and in authorizing this peer to generate at most N replications of this content item for other peers it will meet and which does not possess it, where N is an integer value depending on the current value of this request counter and of an impatience reaction function which is representative of the mean time these peers are ready to wait for obtaining this content item.

16 Claims, 1 Drawing Sheet

(56) References Cited

U.S. PATENT DOCUMENTS

| | | | |
|---|---|---|---|
| 8,194,598 B2 | 6/2012 | Attar et al. | |
| 2007/0297422 A1* | 12/2007 | Matsuo et al. | 370/400 |
| 2008/0027897 A1 | 1/2008 | Ushiyama et al. | |
| 2009/0083279 A1* | 3/2009 | Hasek | 707/10 |
| 2009/0168795 A1* | 7/2009 | Segel | 370/429 |
| 2010/0229222 A1* | 9/2010 | Li et al. | 726/5 |
| 2010/0257239 A1* | 10/2010 | Roberts | 709/204 |

FOREIGN PATENT DOCUMENTS

| | | |
|---|---|---|
| CN | 1696936 | 1/2007 |
| JP | 2006155486 | 6/2006 |
| JP | 2006277337 | 10/2006 |
| JP | 2007065714 | 3/2007 |
| JP | 2007219653 | 8/2007 |

OTHER PUBLICATIONS

Murphy, "Using Lime to Support Replication for Availability in Mobile Ad Hoc Networks", Pub. Date: 2006, pp. 1-18.*

Jie, Xu et al., "A Mixed Adaptive Load Balancing Policy for Chord" Apperceiving Computing and Intelligence Analysis, 2008 IEEE, Piscataway, NJ, Dec. 13, 2008, pp. 124-127.

European Search Report for Application No. EP 09 30 5395 dated Sep. 28, 2009.

Balasubramanian et al., "DTN routing as a resource allocation problem", SIGCOMM 2007 Proceedings of the 2007 conference on Applications, technologies, architectures, and protocols for computer communications, Aug. 27, 2007, Kyoto, Japan, pp. 1-12.

Boldrini et al., "ContentPlace: social-aware data dissemination in opportunistic networks", MSWiM 2008 Proceedings of the 11th international symposium on Modeling, analysis and simulation of wireless and mobile systems, Oct. 27, 2008, Vancouver, British Columbia, Canada, pp. 1-8.

Boldrini et al., "Modelling data dissemination in opportunistic networks", CHANTS 2008 Proceedings of the third ACM workshop on Challenged networks, Sep. 14, 2008, San Francisco, California, USA, pp. 1-12.

Boyd et al., "Convex Optimization", Cambridge University Press, Cambridge, 2004, pp. 1-730.

Chaintreau et al., "Impact of human mobility on opportunistic forwarding algorithms", Mobile Computing, IEEE Transactions on, vol. 6, Iss. 6, Jun. 2007, pp. 606-620.

Cohen et al., "Replication strategies in unstructured peer to peer networks", SIGCOMM 2002 Proceedings of the 2002 conference on Applications, technologies, architectures, and protocols for computer communications, Aug. 19, 2002, Pittsburgh, Pennsylvania, USA, pp. 1-14.

Costa et al., "Socially-aware routing for publish-subscribe in delay-tolerant mobile ad hoc networks", IEEE Journal on Selected Areas in Communications, vol. 26, Iss. 5, Jun. 2008, pp. 1-13.

Greifenberg et al., "Efficient publish subscribe based multicast for opportunistic networking with self organized resource utilization", 22 nd International Conference on Advanced Information Networking and Applications—Workshops, 2008, Okinawa, Japan, Mar. 25, 2008, pp. 1-7.

Grossglauser et al., "Mobility increases the capacity of ad hoc wireless networks", IEEE/ACM Transactions on Networking, vol. 10, No. 4, Aug. 2002, pp. 477-486.

Karlsson et al., "Delay tolerant broadcasting", ACM SIGCOMM 2006 Workshops, Sep. 11, 2006, Pisa, Italy, pp. 1-8.

Karagiannis et al., "Power law and exponential decay of inter contact times bewteen mobile devices", MobiCom 2007 Proceedings of the 13th annual ACM international conference on Mobile computing and networking, Sep. 9, 2007, Montréal, Canada, pp. 1-12.

Seth et al., "Low-cost communication for rural internet kiosks using mechanical backhaul", MobiCom 2006 Proceedings of the 12th annual international conference on Mobile computing and networking, Sep. 24, 2006, Los Angeles, CA, USA, pp. 1-12.

Yoneki et al., "A socio-aware overlay for publish/subscribe communication in delay tolerant networks", MSWiM 2007 Proceedings of the 10th ACM Symposium on Modeling, analysis, and simulation of wireless and mobile systems, Oct. 22, 2007, Chania, Crete Island, pp. 1-10.

* cited by examiner

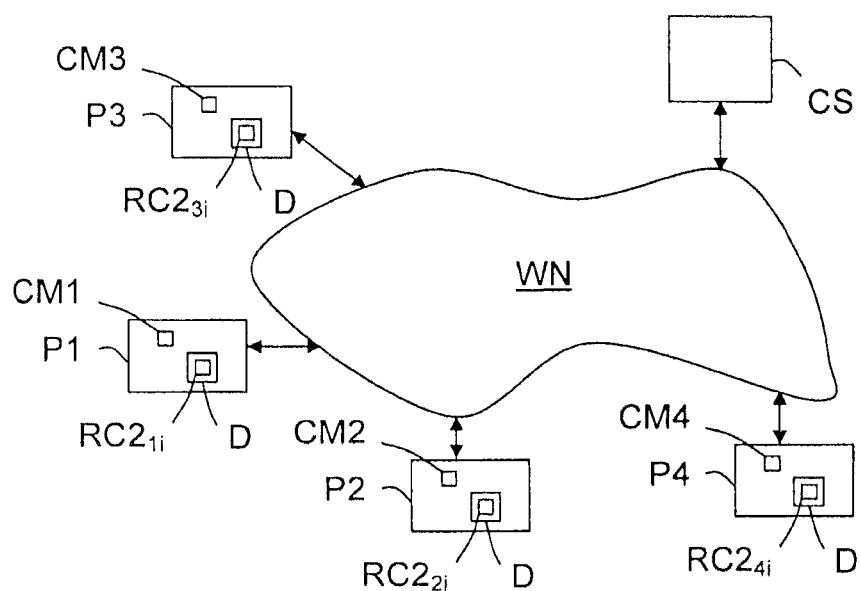

DEVICE AND METHOD FOR CONTROLLING DISSEMINATION OF CONTENTS BETWEEN PEERS HAVING WIRELESS COMMUNICATION CAPACITIES, DEPENDING ON IMPATIENCE REACTION FUNCTIONS

CROSS REFERENCE TO RELATED APPLICATIONS

This application is a Continuation of co-pending U.S. patent application Ser. No. 12/799,876 filed on May 4, 2010, which is incorporated herein by reference.

BACKGROUND

1. Field of the Invention

The present invention relates to content dissemination between peers in a peer-to-peer (or "P2P") wireless environment.

One means here by "peer" a wireless communication equipment capable of exchanging data (or symbols (i.e. blocks or packets or chunks of data)) with other peers or network equipments in a P2P mode through wireless communications. So, a peer may be a laptop, a smartphone, a mobile or cellular telephone, a personal digital assistant (PDA), provided that it comprises a wireless communication interface (or any equivalent wireless communication means), or a node associated to a vehicle (for instance a bus or a car) or a base station that is assisting opportunistic content delivery in an area (such as a content "booth" (or a "throwbox")).

Moreover, one means here by "content dissemination" the transmission of content data between peers in order each of these peers had these content data at its disposal or at the disposal of other peers.

More, one means here by "content" any type of set of data that can be disseminated in a P2P mode, and notably files of information data, videos, chunks of video, pictures to share, html files, audio files and software updates, and more generally any type of file, hereafter called "item".

2. Description of the Prior Art

The number of wireless communication equipments (and notably mobile telephones, smartphones and portable equipments), capable of displaying, storing and transmitting contents, is increasing, and the operators of wireless communication networks are facing a main issue: how to disseminate the contents efficiently between wireless communication equipments.

Today, most of the wireless content dissemination applications proceed to content dissemination by means of a direct transmission through a centralized infrastructure. However, this solution is both expensive for the content provider and inefficient from a networking perspective as it leaves unused the potentially very large quantity of bandwidth which is available for content exchange between wireless communication equipments within short range radio transmission (e.g. Bluetooth or IEEE 802.11).

Networks that leverage local connection opportunities to communicate in a delay tolerant manner can be classified into two different categories. A first category comprises networks involving nodes with scheduled or controlled routes and using a routing protocol to communicate critical information in due time. A second category comprises networks to which wireless communication equipments with unpredictable mobility are connected, e.g. because their users are attending a conference or a common event. In the latter case, no protocol can guarantee to deliver a message within a fixed time although the performance of a peer-to-peer application can still be acceptable.

It is recalled that in a P2P environment, communication equipments (or peers) meet according to a simple homogeneous and memoryless process, as if they follow uncoordinated mobility, and have a dedicated buffer (or cache memory) which can be filled with content items (or files) that could be requested later by other peers. The demands (or requests) for different content items arise according to a stationary regime that can follow an arbitrary popularity distribution. In contrast with traditional fixed P2P networks, in wireless P2P networks the time elapsed between the demand arising and the fulfillment of this demand can be far from negligible. So, this time elapsed (or delay to fulfil a request) plays an important role in the perception of the P2P network by users. Indeed, in some cases it may happen that the interest for a content item becomes obsolete before the peer has any chance to receive this content item. Such a behavior is generally referred to as "impatience".

SUMMARY

So the object of this invention is to provide a method and an associated control device allowing to reduce the mean time that is necessary to a wireless communication equipment to obtain a chosen content item in a wireless P2P environment by an appropriate allocation of content to cache memory, and notably by taking the best advantage of contact opportunities between peers under general conditions on content popularity and user behavior.

More precisely, the invention provides a method, intended for controlling dissemination of content in a peer-to-peer mode between peers having wireless communication capacities, and comprising the steps of, each time a peer receives a content item it had requested and which is associated to a request counter (used during the search phase):

i) creating at least one set of instructions intended for allowing replication of this content item by the considered peer, and ii) authorizing this considered peer to generate at most N replications of this content item for other peers it will meet (in the future) and which does not yet possess it, where N is an integer value depending on the current value ($V1_{ri}$) of the request counter and of an impatience reaction function ($f_i$) which is representative of the mean time the peers (of the network) are ready to wait for obtaining this content item.

The method according to the invention may include additional characteristics considered separately or combined, and notably:

N may be a power function of the type $A \cdot f_i(V1_{ri}) = A \cdot V1_{ri}^{ri}$ or of the type $A \cdot f_i(V1_{ri}) = A \cdot V1_{ri}^{(ri-1)/ri}$, for instance, where A is a chosen normalization constant;

in step ii), each time the considered peer meets another peer which does not possess a content item that it is still authorized to replicate, one may generate a replication of this content item by means of the associated set of instructions, and this considered peer may transmit this generated replication to the other peer;

in step ii) one may generate the replication of a content item if, and only if, the other peer has requested this content item;

in a variant, in step (ii) one may generate automatically the replication of a content item for the other peer even if the latter has not requested this content item;

when the other peer receives the replication of the content item and comprises a cache memory for storing content items, this received replication may replace the oldest content item of this cache memory if the latter is full;

each time a peer receives a content item, it may store this content item into a cache memory, and one may associate a replication counter (used in the replication phase) to this content item, with an initial value ($V2_{ri}$) equal to N, for this considered peer, and each time this considered peer generates a replication of a content item (associated to a replication counter and stored into this cache memory), one may decrement by one the value ($V2_{ri}$) of this replication counter, and when the replication counter value ($V2_{ri}$) becomes equal to 0, one may delete this replication counter;

when a content item is no more stored into a cache memory of a peer while the value ($V2_{ri}$) of the replication counter associated to this content item is smaller than N, one may keep this replication counter with its current value ($V2_{ri}$), and if this considered peer receives again this content item, one may associate this replication counter with its current value ($V2_{ri}$) to this received content item;

one may keep the replication counter with its current value ($V2_{ri}$) during a chosen period of time, and if the considered peer receives again a content item before the expiration of this period of time, one may associate this replication counter with its current value ($V2_{ri}$) to this received content item, otherwise this replication counter is deleted at the expiration of its associated period of time;

in step i) one may create N sets for N replications of a new content item, and each time a replication of this content item needs to be generated, one may use a remaining one of these N created sets associated to this content item.

The invention also provides a control device, intended for controlling dissemination of content in a peer-to-peer mode from an associated peer to other peers through wireless communications, and arranged, each time its associated peer receives a content item it had requested and which is associated to a request counter having a current value ($V1_{ri}$):

for creating at least one set of instructions intended for allowing replication of this content item by its associated peer, and for computing an integer value N, which depends on the current value ($V1_{ri}$) of this request counter and of an impatience reaction function (t) which is representative of the mean time the peers (of the network) are ready to wait for obtaining this content item, in order to authorize its associated peer to generate at most N replications of this content item for other peers it will meet (in the future) and which does not yet possess it.

The control device according to the invention may include additional characteristics considered separately or combined, and notably:

it may be arranged, each time its associated peer meets another peer which does not possess a content item, for checking if its associated peer is still authorized to generate a replication of the content item, and in the affirmative for authorizing such a generation by means of the associated set of instructions;

it may be arranged, each time it authorizes its associated peer to generate a replication of a content item (associated to a replication counter and stored into a cache memory), for decrementing by one the value ($V2_{ri}$) of this replication counter, and when this replication counter value ($V2_{ri}$) becomes equal to 0, for deleting this replication counter;

it may be arranged, when a content item is no more stored into a cache memory of its associated peer, while the value ($V2_{ri}$) of the replication counter associated to this content item is smaller than N, for keeping this replication counter with its current value ($V2_{ri}$), and when its associated peer receives again this content item, for associating this replication counter with its current value ($V2_{ri}$) to this received content item;

it may be arranged for keeping the replication counter with its current value ($V2_{ri}$) during a chosen period of time, and, if its associated peer receives again a content item before the expiration of this period of time, for associating this replication counter with its current value ($V2_{ri}$) to this received content item, otherwise for deleting this replication counter at the expiration of its associated period of time;

it may be arranged for creating N sets for replications of a content item, and, each time a replication of this content item needs to be generated, for providing its associated peer with a remaining one of these N created sets associated to this content item.

The invention also provides a peer (or wireless communication equipment) capable of establishing connection(s) with other peers through wireless communications and comprising a control device such as the one above introduced.

BRIEF DESCRIPTION OF THE DRAWINGS

Other features and advantages of the invention will become apparent on examining the detailed specification and the appended drawing, wherein FIG. 1 schematically and functionally illustrates four wireless communication equipments (or peers) connected to a wireless communication network and each comprising an example of embodiment of a control device according to the invention.

DESCRIPTION OF THE PREFERRED EMBODIMENTS

The appended drawing may serve not only to complete the invention, but also to contribute to its definition, if need be.

The invention aims at offering a method and an associated control device D allowing to control P2P dissemination of contents between peers Pj (here, j=1 to 4) connected therebetween through wireless communications.

For instance these wireless communications are established via a wireless communication network WN. In the following description it will be considered that the wireless communication network WN is an IEEE 802.11 network (i.e. a WLAN (Wireless Local Area Network), for instance of the WiFi type). But the invention is not limited to this type of wireless communication network. Indeed, a wireless communication network may be also a mobile or cellular network, a Zygbee network, an Ultra Wide band network, an IEEE 802.15 network, or a Bluetooth network, for instance.

Moreover, in the following description it will be considered that peers Pj are mobile telephones. But the invention is not limited to this type of wireless communication equipment. Indeed, the invention concerns any type of wireless communication equipment comprising at least one executable P2P communication application and capable of exchanging data (or symbols) with other wireless communication equipments or network equipments in a P2P mode through wireless communications. So, a peer may be also a laptop, a smartphone, a personal digital assistant (PDA), provided that it comprises a wireless communication interface (or any equivalent wireless communication means), or a node associated to a vehicle (for instance a bus or a car) or a base station that is assisting opportunistic content delivery in an area (such as a content "booth" (or a "throwbox")).

More, in the following description it will be considered that the contents to be disseminated are videos. But the invention is not limited to this type of content. Indeed, the invention concerns any type of content which can be disseminated in a P2P mode, and notably files of information data, chunks of video, pictures to share, html files, audio files and software updates, and more generally any type of file.

As illustrated in FIG. 1, contents may be initially provided to some of the peers Pj, through the (wireless communication) network WN, by a content server CS which is connected or accessible to said network WN.

The invention concerns a group of at least two peers Pj (here mobile telephones). In the illustrated and non limiting example the group comprises four peers P1 to P4 (j=1 to 4). But the invention concerns any group comprising at least two peers capable of exchanging content data therebetween.

As mentioned before the invention offers notably a method intended for controlling dissemination of content (and more precisely of content items CIi) in a peer-to-peer (P2P) mode between peers Pj. This method comprises two main steps which are implemented each time a peer Pj receives a content item CIi it had requested before and which is associated to a request counter $RC1_{ji}$.

It is important to note that each peer Pj comprises a first cache memory (or buffer) CMj in which it stores content items CIi received from other peers Pj' (j'≠j) or from the content server CS, in order of arrival. When the first cache memory (or buffer) CMj is full and that its peer Pj receives a content item, the oldest content item it contains is replaced with this content item.

Moreover, when a peer Pj wants to obtain a content item CIi, it generates a dedicated request or demand containing an identifier of this requested content item CIi and transmits this dedicated request to one or more other peers Pj' (j'≠j), eventually selected. One assumes, here, that the gain of a request being fulfilled is a function of the time elapsed since this request was expressed (or generated).

More, each time a peer Pj generates a dedicated request for a content item CIi, it also creates a request counter $RC1_{ji}$ which is dedicated to this content item CIi and which has an initial value $V1_{ri}$ set to zero. Then, each is time this peer Pj meets (or contacts) an other peer Pj'(j'≠j) and cannot obtain the requested content item CIi from this other peer Pj', it increments by one the value $V1_{ri}$ of this request counter $RC1_{ji}$, and when the value $V1_{ri}$ of this request counter $RC1_{ji}$ becomes equal to a chosen (maximum) value M (for instance equal to 500 (but it may take any chosen value)) it remains at this value M. In a variant, the value $V1_{ri}$ of the request counter $RC1_{ji}$ may be automatically and periodically incremented by one as long as the peer Pj does not obtain the corresponding requested content item CIi from another peer Pj', and when the value $V1_{ri}$ of this request counter $RC1_{ji}$ becomes greater than a chosen value M (for instance equal to 500) it remains at this value M. In both cases, when the peer Pj obtains a requested content item CIi from another peer Pj', it deletes the corresponding request counter $RC1_{ji}$.

One may assume that contacts (or meetings) between peers Pj an Pj' occur in continuous time and follow the statistics of a Poisson process with rate .mu. One may also assume that contacts between peers Pj an Pj' are symmetric (Pj contacts Pj' whenever Pj' contacts Pj). This assumption models well a situation where peers attend a common event.

The method, according to the invention, can be implemented by control devices D according to the invention which are respectively associated to peers Pj, i.e. which are each dedicated to the control of content dissemination of one associated peer Pj.

As it is schematically illustrated in FIG. 1, each (control) device D may be located into its associated peer Pj. But each device D could be also an equipment or element coupled to its associated peer Pj.

So, a device D can be made of software modules, at least partly, or of electronic circuit(s) or hardware modules, or else of a combination of hardware and software modules (in this case the device D comprises also a software interface allowing interworking between the hardware and software modules).

A first main step (i) of the method consists, when a peer (for instance P1) receives a new requested content item CIi (associated to a request counter $RC1_{1i}$), from another peer Pj' (j'≠1) or from the content server CS, in creating at least one set of instructions (or "mandate") which is intended for allowing replication of this content item CIi by this peer P1.

A first main step (i) can be implemented by means of the device D which is associated to peer P1. More precisely, the device D of peer P1 is arranged, each time the latter (P1) receives a requested content item CIi for creating at least one set of instructions (or mandate) to allow its peer P1 to generate at least one replication of this content item CIi.

A second main step (ii) of the method consists in authorizing the peer P1 to generate at most N replications of the content item CIi for at least N other peers Pj' (j'≠1) it will meet in the future and which does not yet possess this content item CIi.

According to the invention, N is an integer value which depends on the current value V1.sub.ri of the request counter $RC1_{ji}$ (which is associated to the content item CIi received by peer Pj) and of an impatience reaction function $f_i$ dedicated to this content item CIi.

This impatience reaction function $f_i$ is a function which is known by every peer Pj and which is representative of the mean time the peers Pj of the network WN are ready to wait for obtaining a content item CIi. In other words an impatience reaction function $f_i$ denotes the value of fulfilling a request for a content item CIi after some time. So, an impatience reaction function $f_i$ characterizes how the allocation depends on popularity of contents. It can be shown that if the users are monotonically impatient (i.e. if they receive higher gain when their demand is satisfied faster) then a unique optimal cache memory allocation exists, in the sense that it satisfies user needs in the best possible way, accounting for their impatience. However, computing this optimal allocation requires to have a good estimate of the frequency of demands (or requests) for each content item, and it can be computationally expensive. This invention is precisely bypassing this costly step, by means of a distributed adaptive mechanism which is shown to converge to this optimal point, without the need to maintain estimate of frequency of demand (or request).

The impatience reaction function $f_i(V1_{ri})$ depends on user's behavior and can be any arbitrary function. As an example, it may be a power function such as $f_i: V1_{ri} \to V1_{ri}^{ri}$, where ri is any real number, or a combination of power and root functions such as $f_i: V1_{ri} \to V1_{ri}^{(ri-1)/ri}$ where again ri is any real number. The impatience reaction function $f_i(V1_{ri})$ and the parameter ri may vary with the content item CIi. The identity impatience reaction function $f_i: V1_{ri} \to V1_{ri}$ is well suited to achieve an allocation of items to cache memory as a function of the square root of popularity, which is known to be optimal for minimizing delay. More generally, different impatience reaction function can minimize a given objective that represents better user's behavior.

For instance, N is a power function of the type $A \cdot f_i(V1ri) = A \cdot V1_{ri}^{ri}$, where A is a chosen normalization constant. But, N may be determined by means of other impatience reaction functions using $V1_{ri}$ and ri. For instance, such a function may be an exponential.

So, the invention offers a mechanism which makes an average number <Ci> of copies per request for a content item CIi. If newly made replications overwrite replications currently in first cache memory CMj with equal probability, then in steady-state the proportion of space taken up by each content item CIi in the distributed first cache memories CMj should be equivalent to the ratio of the number of copies made for that content item CIi to the number of copies made for all the content items. Consequently, in steady state each content item CIi should have a number of copies X; proportional to frequency $d_i$ of requests for that content item CIi times the average number of copies <Ci> made for that content item CIi per request:

$$X_i \alpha d_i \cdot \langle Ci \rangle = \langle f(V_{r1i}) \rangle.$$

Ignoring skew, one can claim that $\langle Ci \rangle \approx f(\langle V_{r1i} \rangle)$ and that the peer meetings follow a Poisson distribution $\langle Ci \rangle = X/X_i$.

Consequently, when $f(.)=(.)^{r-1}$ one has:

$$X_i \propto di \cdot \left(\frac{x}{x_i}\right)^{r-1} \Rightarrow X_i^r \propto d_i \cdot X^{r-1} \Rightarrow X_i \Rightarrow \propto d_i^{\frac{1}{r}},$$

and when $f(.)=(.)^{(r-1)/r}$ one has:

$$X_i \propto di \cdot \left(\frac{x}{x_i}\right)^{\frac{r-1}{r}} \Rightarrow X_i^{\frac{1}{r}} \propto d_i \cdot X^{\frac{r-1}{r}} \Rightarrow X_i \Rightarrow \propto d_i^r$$

This is the device D, which is associated to a peer Pj having to generate a replication for another peer Pj', that authorizes its peer Pj to proceed to such a generation after having determined if it was possible.

This is also a device D which determines (or computes) N for its associated peer Pj, from the current value $V1_{ri}$ of the request counter $RC1_{ji}$ (which is associated to a new content item CIi received by its associated peer Pj) and the impatience reaction function $f_i$ associated to this content item CIi. Such a computation can be carried out by a device D during the first step (i). In this case the device D may create not only one set (or mandate) for N replications of a content item CIi by its associated peer Pj, but N sets (or mandates), one for each of the possible N replications of a content item CIi.

During the second step (ii), each time a peer Pj (for instance P1) meets another peer Pj' which does not yet possess a content item CIi that this peer P1 stores in its first cache memory CM1 and is still authorized to replicate, one may generate a replication of this content item CIi by means of the associated set of instructions (or mandate). Then the peer P1 transmits this generated replication to the other peer Pj'.

Such a replication may be generated either on request of the other peer Pj', or automatically just because peer P1 has discovered that the other peer Pj' was not storing the content item CIi in its first cache memory CMj' and even if the other peer Pj' has not requested this content item CIi.

When the other peer Pj' receives the replication of a content item CIi, it stores it into its first cache memory CMj'. If the latter (CMj') is full the other peer Pj' preferably replaces the oldest content item of its first cache memory CMj' with the received replication. Some content items CIi may be "sticky", i.e. cannot be deleted. Such a sticky content item can be a content item which is initially provided by the content server CS, for instance.

As mentioned before, during the second step (ii), when a peer Pj (for instance P1) receives a content item CIi, it stores this content item CIi into its first cache memory CMj. But, one may also create and associate a replication counter RC2; to this received content item CIi, with an initial value $V2_{ri}$ equal to N, for the concerned peer Pj.

Since one has $V2_{ri} = A \cdot f(V1_{ri})$ and since f(.) may be a power or any function, $V2_{ri}$ may sometimes not be an integer. In this last case it is important not to do rounding and choose the closest integer. This can be done as follows. When $V2_{ri} > 1$ one may proceed exactly as mentioned before (replication when possible and then decrement of the replication counter $RC2_{ji}$ by 1). When $0 < V2_{ri} < 1$, which will happen eventually if $V2_{ri}$ is not an integer after it has been decremented by 1 several times, one may take a uniform random variable U in the interval [0;1] with a random number generator, and if $U < V2_{ri}$ then one may proceed to a replication or else one does nothing and one sets $V2_{ri}$ to 0. So, whatever the value of $V2_{ri} = A \cdot f(V1_{ri})$ then the expected number of replication is exactly $V2_{ri}$ (and not an integer approximation of it). This may be important to avoid bias (and especially when A is small).

So, each time this peer Pj generates a replication of a content item CIi which is associated to a replication counter $RC2_{ji}$ and which is stored into its first cache memory CMj, one may decrement by one the value $V2_{ri}$ of this replication counter $RC2_{ji}$, and when the replication counter value $V2_{ri}$ becomes equal to 0, one deletes the replication counter $RC2_{ji}$. Therefore, peer Pj cannot be authorized again to generate a replication of the content item CIi which was associated till now to this deleted replication counter $RC2_{ji}$, except if the peer Pj decides, after some time, to request again the same content item. This last case may happen in case of returning request (or demands), i.e. when a peer wishes to access a given file multiple times but not necessarily to keep it in memory all the time.

This is a device D which creates and associates a replication counter $RC2_{ji}$ to a content item CIi received by its associated peer Pj, with an initial value $V2_{ri}$ equal to the current value $V1_{ri}$ of the request counter $RC1_{ji}$ associated to the considered content item CIi. This is also a device D which will decrement the value $V2_{ri}$ of a replication counter $RC2_{ji}$ that it has created and which will delete this replication counter $RC2_{ji}$ when its value $V2_{ri}$ becomes equal to 0.

Preferably, when a content item CIi is no more stored into the first cache memory CMj of a peer Pj, while the value $V2_{ri}$ of the replication counter $RC2_{ji}$, which was associated to this content item CIi, is smaller than N, one may keep alive this replication counter $RC2_{ji}$ with its current value $V2_{ri}$. So, if the considered peer Pj receives later again a new copy of this content item CIi, one may associate the kept alive replication counter $RC2_{ji}$ with its current value $V2_{ri}$ to this new copy. This is to avoid that some replications get cancelled, which would bias the allocation of content items to cache memory too much in favor of popular items.

This is a device D which keeps alive a replication counter $RC2_{ji}$ and proceeds to its re-association when necessary.

A replication counter $RC2_{ji}$ may be kept alive indefinitely till it is deleted because its current value $V2_{ri}$ became greater than N. But, in a variant, one may keep alive the replication counter $RC2_{ji}$ with its current value $V2_{ri}$ during a chosen period of time. In this case, if a peer Pj receives a new version of a content item CIi before the expiration of the period of time which is associated to the corresponding replication counter $RC2_{ji}$, one may associate this replication counter $RC2_{ji}$ with its current value $V2_{ri}$ to the new version received. Otherwise this replication counter $RC2_{ji}$ is deleted at the expiration of its associated period of time. This is a device D which manages each period of time associated to each replication counter $RC2_{ji}$ that it keeps alive.

When N is computed (or determined) during the first step (i) and that N sets (or mandates) are generated (by a device D) for N replications of a content item CIi by a peer Pj, each time a peer Pj is authorized (by its device D) to generate a replication of a content item CIi, it may use a remaining one of the N sets that have been previously created for generating replications of this content item CIi. But such an option is not mandatory because a peer Pj may also use N times the same set (or mandate), previously created for generating N replications of this content item CIi, as long as the corresponding replication counter $RC2_{ji}$ is not greater than N.

The invention implicitly adapts to the current cache memory allocation and collection of requests. Indeed, computing the optimal allocation of content items to cache memory requires to have a good estimate of the frequency of demands (or requests) for each content item, and it can be computationally expensive. This invention avoids this step, by finding a distributed adaptive mechanism which is shown to converge to this optimal point, without the need to maintain estimate of frequency of demand (or request).

Moreover, the invention does not require to monitor popularity of contents. In fact content popularity is implicitly taken into account through the impatience reaction function.

More, the invention allows to operate on top of opportunistic bandwidth which is ideally suited to nomadic deployment.

The invention is not limited to the embodiments of method, control device and peer (or wireless communication equipment) described above, only as examples, but it encompasses all alternative embodiments which may be considered by one skilled in the art within the scope of the claims hereafter.

What is claimed is:

1. A method for controlling dissemination of content in a peer-to-peer mode between mobile peers having wireless communication capacities, wherein, each time a peer receives a content item said peer had requested and which is associated to a request counter, the method comprising:
storing said content item into a cache memory of said peer;
creating at least one set of instructions intended for allowing replication of said content item by said peer;
authorizing said peer to generate at most N replications of said content item for other peers said peer will meet and which does not possess said content item, N being an integer value depending on a current value $V1_{ri}$ of said request counter and of a determined impatience reaction function $f_i$ representative of the mean time said other peers are ready to wait for obtaining said content item, wherein N is a power function of the type $A \times f_i(V1_{ri}) = A \times V1_{ri}^{ri}$, where A is a chosen normalization constant and $r_i$ is a real number; and
transmitting at least one of said N replications of said content item to at least one of said other peers through said wireless communication capacities.

2. The method according to claim 1, wherein in the authorizing step, each time said peer is in contact with another peer which does not possess the content item that said peer is still authorized to replicate, a replication of said content item is generated by means of the associated set of instructions, and said peer transmits said generated replication to said other peer.

3. The method according to claim 2, wherein said replication of said content item is generated only if said other peer has requested said content item.

4. The method according to claim 2, wherein said replication of said content item is generated automatically for said other peer even if said other peer has not requested said content item.

5. The method according to claim 1, wherein each time said peer receives the content item, said peer associates a replication counter to said content item, with an initial value $V2_{ri}$ equal to N, for said peer, and each time said peer generates a replication of a content item associated to a replication counter and stored into said cache memory, the value $V2_{ri}$ of said replication counter is decremented by one, and when said replication counter value $V2_{ri}$ becomes equal to 0, said replication counter is deleted.

6. The method according to claim 5, wherein when the content item is no longer stored in said cache memory of said peer, while the value $V2_{ri}$ of the replication counter associated to the content item is smaller than N, said replication counter is maintained with its current value $V2_{ri}$, and if said peer receives again the content item, said replication counter with its current value $V2_{ri}$ is associated with said received content item.

7. The method according to claim 6, wherein said replication counter is maintained with its current value $V2_{ri}$ during a chosen period of time, and if said peer receives again the content item before the expiration of said period of time, said replication counter with its current value $V2_{ri}$ is associated with said received content item, otherwise said replication counter is deleted at the expiration of its associated period of time.

8. The method according to claim 1, wherein in the creating step N sets of instructions for replications of said content item are created, and each time a replication of said content item needs to be generated, a remaining one of said N created sets associated to said content item is used.

9. A method for controlling dissemination of content in a peer-to-peer mode between mobile peers having wireless communication capacities, wherein, each time a peer receives a content item said peer had requested and which is associated to a request counter, the method comprising:
storing said content item into a cache memory of said peer;
creating at least one set of instructions intended for allowing replication of said content item by said peer;
authorizing said peer to generate at most N replications of said content item for other peers said peer will meet and which does not possess said content item, N being an integer value depending on a current value $V1_{ri}$ of said request counter and of a determined impatience reaction function $f_i$ representative of the mean time said other peers are ready to wait for obtaining said content item, wherein N is a power function of the type $A \times f_i(V1_{ri}) = A \times V1_{ri}^{(ri-1)/ri}$, where A is a chosen normalization constant and $r_i$ is a real number; and
transmitting at least one of said N replications of said content item to at least one of said other peers through said wireless communication capacities.

10. The method according to claim 9, wherein in the authorizing step, each time said peer is in contact with another peer which does not possess the content item that said peer is still authorized to replicate, a replication of said content item is generated by means of the associated set of instructions, and said peer transmits said generated replication to said other peer.

11. The method according to claim 10, wherein said replication of said content item is generated only if said other peer has requested said content item.

12. The method according to claim 10, wherein said replication of said content item is generated automatically for said other peer even if said other peer has not requested said content item.

13. The method according to claim 9, wherein each time said peer receives the content item, said peer associates a replication counter to said content item, with an initial value $V2_{ri}$ equal to N, for said peer, and each time said peer generates a replication of a content item associated to a replication counter and stored into said cache memory, the value $V2_{ri}$ of said replication counter is decremented by one, and when said replication counter value $V2_{ri}$ becomes equal to 0, said replication counter is deleted.

14. The method according to claim 9, wherein when the content item is no longer stored in said a cache memory of said peer, while the value $V2_{ri}$ of the replication counter associated to this content item is smaller than N, said replication counter is maintained with its current value $V2_{ri}$, and if said peer receives again the content item, said replication counter with its current value $V2_{ri}$ is associated with said received content item.

15. The method according to claim 14, wherein said replication counter is maintained with its current value $V2_{ri}$ during a chosen period of time, and if said peer receives again the content item before the expiration of said period of time, said replication counter with its current value $V2_{ri}$ is associated with said received content item, otherwise said replication counter is deleted at the expiration of its associated period of time.

16. The method according to claim 9, wherein in the creating step N sets of instructions for replications of said content item are created, and each time a replication of said content item needs to be generated, a remaining one of said N created sets associated to said content item is used.

\* \* \* \* \*